Figure 1:
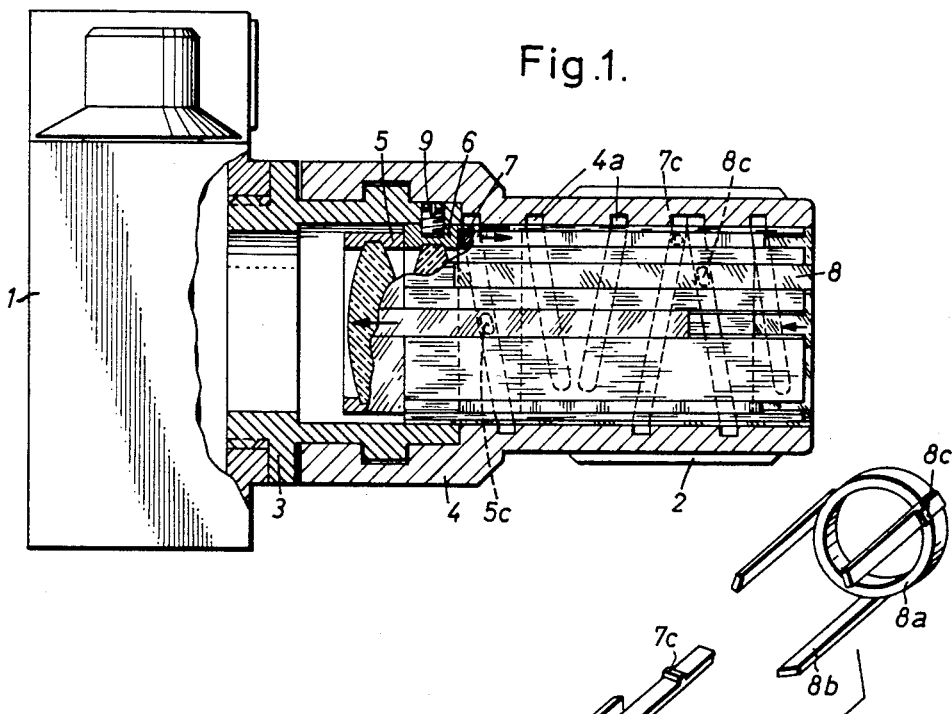

Dec. 29, 1964    H. STAUBACH    3,163,701
VARIABLE FOCAL LENGTH OBJECTIVE MOUNT
Filed Jan. 6, 1961

INVENTOR:
HEINRICH STAUBACH

By Toulmin & Toulmin
Attorneys

United States Patent Office 3,163,701
Patented Dec. 29, 1964

3,163,701
VARIABLE FOCAL LENGTH OBJECTIVE MOUNT
Heinrich Staubach, Midland, Ontario, Canada, assignor to Ernst Leitz Gesellschaft mit beschrankter Haftung, Wetzlar (Lahn), Germany
Filed Jan. 6, 1961, Ser. No. 81,100
Claims priority, application Germany, Jan. 7, 1960, L 35,073
7 Claims. (Cl. 88—57)

The present invention relates to a variable focal length objective lens mount, more particularly, to the mounting of single lenses or groups of lenses in a so-called "zoom" lens to permit varying of the focal length of the objective lens.

The conventional pancratic "zoom" objective comprises a plurality of axially spaced single lenses or groups of lenses which must be displaced axially with respect to each other according to a predetermined mathematic relationship in order to vary the focal length of the objective.

It is therefore necessary to mount the individual optical elements of the objective in such a manner that actuation of a common adjusting device will simultaneously displace all of the optical elements.

One manner in which the above problem has been solved is to employ curved control members which correspond in number to the optical elements which must be varied. The lens mountings and the curved control members are then mounted in a tube.

The disadvantage of this arrangement is that the lenses are closely spaced to each other and, accordingly, each of the individual lens mountings can only be axially displaced a small distance. The length of this displacement should be approximately 1.5 times the diameter of the lens mounting. This axially guided displacement has been obtained by utilizing axially extending guide arms on the peripheries of the lens mountings which guide arms engage axial guides to provide for axial linear displacement of the optical elements.

When the lenses are displaced, however, they must be moved linearly with respect to each other in order to maintain the correct optical relationship between the elements of the objective lens system. It is therefore necessary to provide an additional structure to guide the optical elements in a straight line during displacement.

The present invention eliminates the necessity for the additional guiding structure by providing that the axially extending guide arms of the lens mountings interengage each other. Only one of the lens mountings is secured against rotative movement and, consequently, the mutually interengaging guide arms of the lens mountings guide the various lenses in axial linear movement.

In the present invention the axially extending guide arms which per se have been previously used are so dimensioned with respect to each other that they are free from any play in a rotative direction and, consequently, any movement between the guide arms is in an axial direction. It is therefore not necessary to provide any additional structural elements to guide the lens mountings in straight line movement. The present invention eliminates this additional structure by providing for only one of the lens mountings to be secured against rotative movement. Securing only one mounting against rotative movement will provide a fixed position for all of the other lens mountings since their guide arms are interengaging without any rotative play therebetween.

To adjust the position of the lenses with respect to each other a projection is provided on each of the lens mountings. These projections engage corresponding cam grooves in the inner surface of a rotatable tube which surrounds the objective lens. The cam surfaces are positioned at various angles with respect to the optical axis of the objective lens. These angles are carefully determined on the basis of a mathematical relationship so that the individual lenses will have correct mathematical relationship therebetween for all positions of the objective lens system.

It is therefore the principal object of this invention to provide a novel and improved mounting arrangement for the individual lens or lens groups of a pancratic objective.

It is an additional object of this invention to provide a simple mounting arrangement for the individual lenses or lens groups of a pancratic objective which provides for linear axial displacement of these lenses or lens groups.

Figure 2:
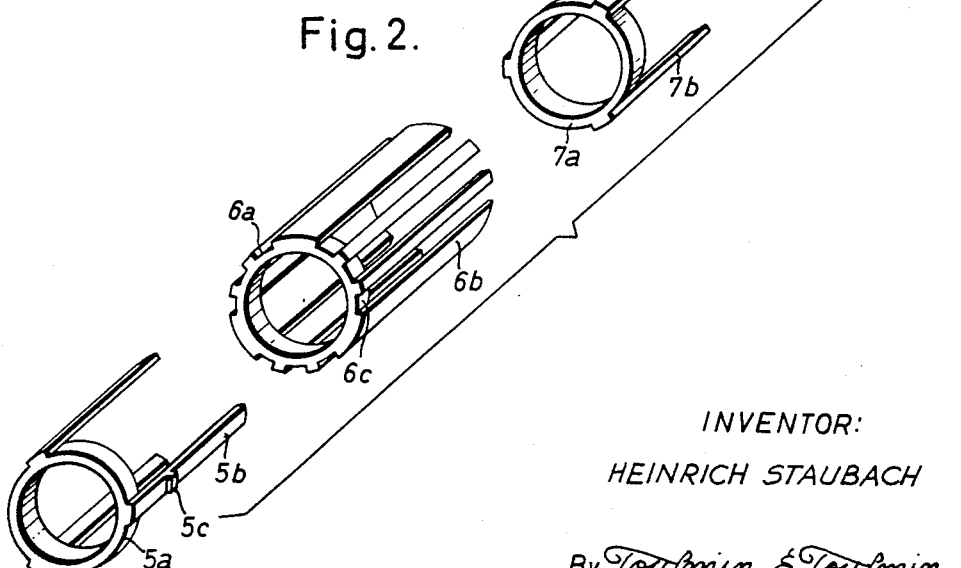

Other objects and advantages of this invention will become apparent upon reference to the accompanying description when taken in conjunction with the following drawings, wherein FIGURE 1 is a vertical cross-sectional view of a pancratic objective embodying the present invention, and FIGURE 2 is an exploded perspective view of the lens mountings of the present invention illustrated at FIGURE 1.

Returning now to the drawings wherein like reference symbols indicate the same parts throughout the various views, there is illustrated in FIGURE 1 a camera 1 having an objective mount 2 attached thereto. The objective mount comprises a tubular portion 3 which is fixedly mounted on the camera and a tube 4 which is rotatably mounted on the fixed tube 3. A plurality of lens mountings 5, 6, 7 and 8, each having an individual lens therein, are arranged within the rotatable tube 4. The mounting 6 is fixedly secured to the stationary tube 3 by a screw or stud bolt 9. The other mountings 5, 7 and 8 are free for axial movement with respect to each other and with respect to the mounting 6.

Proceeding next to FIGURE 2 the structure of each of the lens mountings may be seen. Each of the mountings 5, 6, 7 and 8 comprises a lens mounting ring 5a, 6a, 7a and 8a. Further, each of the mountings has axially extending guide arms 5b, 6b, 7b and 8b. The width of the guide arms 5b, 6b, 7b and 8b and their position on the peripheries of the mounting rings are so chosen that the mountings 5, 6, 7 and 8 can be telescoped or axially displaced in the direction of the arrows shown in FIGURE 1. When the mountings are assembled, as shown in FIGURE 1, the guide arms are mutually interengaging and accordingly guide each other. The guide arms are further constructed so that there is no rotative play between the optical elements when the guide arms are in interengaging position. Each lens mounting can be axially displaced by the length of its axial guide arms. It is thus apparent that the desired axially guided displacement of 1.5 times the diameter of the mounting can be easily obtained.

The mountings 5, 7 and 8 each have a cam follower or guide tongue 5c, 7c, 8c fixedly mounted on at least one of the axially extending arms 5b, 7b and 8b. The cam follower may be integral with the guide arms but must be fixed thereon.

The cam followers project into cam grooves 4a, which are in the inner surface of the rotatable tube 4. Each of the grooves 4a is pitched at such an angle to the optical axis of the objective that the several lenses are in predetermined relationship with each other at all times. The angular positions of the cam grooves 4a may be seen in FIGURE 1 of the drawings.

Thus, in order to adjust the objective lens of this invention the tube 4 is rotated. This rotative movement of the tube is imparted to the cam followers through the cam grooves 4a. Since the various lens mountings of the objective system are fixed against rotative movement the lens mountings can move only in axial direction. This rotation of the tube 4 will bring about the axial movement of all of the lens mountings with respect to each other. During this rotative movement, however, the lens mounting 6 is rigidly fixed against both rotative and axial movement.

As a modification, the lens mounting 6 can be fixed against rotative movement only and is capable of limited linear axial movement. Thus, all of the remaining mountings are axially guided by the mounting 6 and with respect to each other.

It is pointed out that it is not necessary to maintain the whole lens mounting stationary or fixed as in the above-described embodiment. Since all of the lens mountings can be made axially displaceable it is possible with this invention to displace any number of lenses comprising an objective system.

Thus it can be seen that the present invention provides a simple yet effective structure for adjusting axially the several optical elements of an objective system. Further the present invention is considerably simplified over previously known objective lenses since no special structure is necessary to axially guide the several lens mountings.

It will be understood that this invention is susceptible to modification in order to adapt it to different usages and conditions and, accordingly, it is desired to comprehend such modifications within this invention as may fall within the scope of the appended claims.

What I claim is:

1. A pancratic objective mount comprising a plurality of lens mountings, there being a plurality of axially extending guide arms on each of said mountings, the adjacent edges of adjacent guide arms being in sliding relationship so that all of said arms of said mountings are slidably interengaging for relative linear movement therebetween whereby said mountings are axially displaceable with respect to each other, only one of said plurality of lens mountings being fixedly mounted in an objective mount.

2. A pancratic objective mount comprising a plurality of lens mountings, a plurality of axially extending guide arms mounted on the peripheries of said lens mountings, said guide arms being circumferentially spaced around said mountings, the adjacent edges of adjacent guide arms being in sliding relationship so that all of said arms of said mountings are slidably interengaging for relative linear movement therebetween whereby said mountings are axially displaceable with respect to each other, only one of said plurality of lens mountings being fixedly mounted in an objective mount.

3. A pancratic objective mount comprising a tube rotatably mounted in an objective mount, there being a plurality of guide grooves in the inner surface of said tube, a plurality of lens mountings within said tube, a plurality of axially extending guide arms on each of said lens mountings, the adjacent edges of adjacent guide arms being in sliding relationship so that all of said arms of said mountings are slidably interengaging for relative linear movement therebetween whereby said mountings are axially displaceable with respect to each other, a cam follower fixedly mounted on each of said lens mountings and meshing with said guide grooves, respectively, so that rotative movement of said tube produces an axial movement of said lens mountings, only one of said plurality of lens mountings being fixedly mounted in an objective mount.

4. A pancratic objective mount comprising a tube rotatably mounted in an objective mount, there being a plurality of guide grooves in the inner surface of said tube, a plurality of lens mountings within said tube, a plurality of axially extending guide arms on each of said lens mountings, the adjacent edges of adjacent guide arms being in sliding relationship so that all of said arms of said mountings are slidably interengaging for relative linear movement therebetween whereby said mountings are axially displaceable with respect to each other, a cam follower fixedly mounted on an axial guide arm on each of said lens mountings and meshing with said guide grooves, respectively, so that rotative movement of said tube produces an axial movement of said lens mountings, only one of said plurality of lens mountings being fixedly mounted in an objective mount.

5. A pancratic objective mount comprising a tube plurality of guide grooves in the inner surface of said rotatably mounted in an objective mount, there being a tube, said guide grooves being inclined at angles with respect to the longitudinal axis of said tube, a plurality of lens mountings within said tube, a plurality of axially extending guide arms on each of said lens mountings, the adjacent edges of adjacent guide arms being in sliding relationship so that all of said arms of said mountings are slidably interengaging for relative linear movement therebetween whereby said mountings are axially displaceable with respect to each other, a cam follower fixedly mounted on each of said lens mountings and meshing with said guide grooves, respectively, so that rotative movement of said tube produces an axial movement of said lens mountings, only one of said plurality of lens mountings being fixedly mounted in an objective mount.

6. A pancratic objective mount comprising a tube rotatably mounted in an objective mount, there being a plurality of guide grooves in the inner surface of said tube, said guide grooves being inclined at angles with respect to the longitudinal axis of said tube, said angles being so selected that said lens mountings move relatively to each other according to a predetermined mathematical relationship, a plurality of lens mountings within said tube, a plurality of axially extending guide arms on each of said lens mountings, the adjacent edges of adjacent guide arms being in sliding relationship so that all of said arms of said mountings are slidably interengaging for relative linear movement therebetween whereby said mountings are axially displaceable with respect to each other, a cam follower fixedly mounted on each of said lens mountings and meshing with said guide grooves, respectively, so that rotative movement of said tube produces an axial movement of said lens mountings, only one of said plurality of lens mountings being fixedly mounted in an objective mount.

7. A pancratic objective mount comprising a plurality of lens mountings, means for fixedly mounting only one of said plurality of lens mountings in an objective mount, a plurality of axially extending guide arms on each of said lens mountings, the guide arms of the remaining lens mountings being slidably mounted between the guide arms of said fixed lens mountings so that said lens mountings are axially displaceable with respect to each other, the adjacent edges of adjacent guide arms being in sliding relationship so that all of the guide arms are slidingly interengageable.

References Cited by the Examiner

UNITED STATES PATENTS

| 1,331,174 | 2/20 | Wescott | 95—45 |
| 2,945,419 | 7/60 | Bechtold et al. | 88—57 |

JEWELL H. PEDERSEN, *Primary Examiner.*

ÉMIL G. ANDERSON, *Examiner.*